(No Model.)

S. OAKMAN.
PROCESS OF FORMING SCREWS IN ARTICLES OF GLASS.

No. 247,100. Patented Sept. 13, 1881.

WITNESSES
Frank G. Parker
Helen M. Feegan

INVENTOR
Samuel Oakman

United States Patent Office.

SAMUEL OAKMAN, OF WINCHESTER, ASSIGNOR TO EDWARD C. SHERBURNE, OF BOSTON, MASSACHUSETTS.

PROCESS OF FORMING SCREWS IN ARTICLES OF GLASS.

SPECIFICATION forming part of Letters Patent No. 247,100, dated September 13, 1881.

Application filed July 18, 1881. (No model.)

*To all whom it may concern:*

Be it known that I, SAMUEL OAKMAN, of Winchester, in the county of Middlesex and State of Massachusetts, have invented an Improved Process of Forming Screws in Articles of Glass, of which the following is a specification.

The object of my invention is to form internal screws in solid glass articles without requiring the glass to shrink onto a metal core, either temporarily or permanently. I attain this object by a series of operations illustrated in the accompanying drawings, in which—

Figure 1:
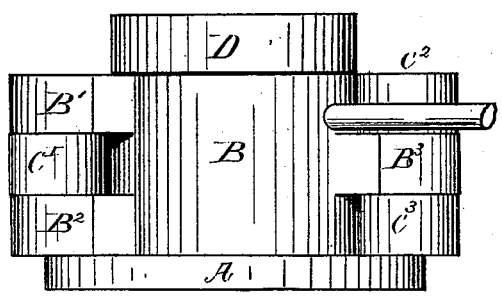
Figure 2:
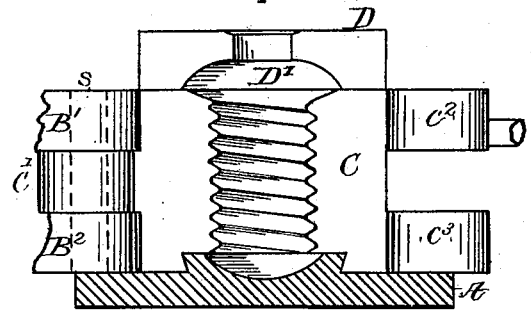
Figure 3:
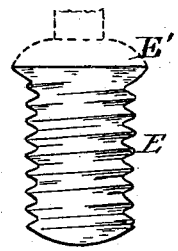
Figure 4:
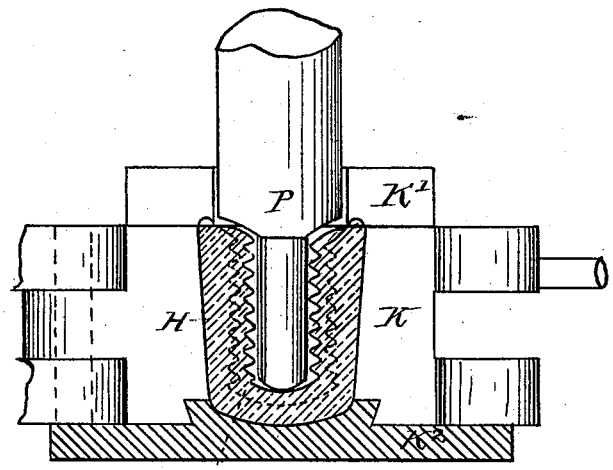
Figure 5:
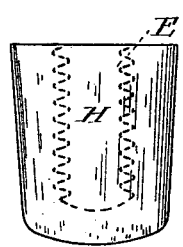

Figure 1 is a glass-blowing mold shown in elevation, Fig. 2 being a section of the same. Fig. 3 shows in elevation a thin cylinder of glass, having both its interior and exterior surfaces in the form of a screw, it being blown in the mold shown in Figs. 1 and 2. Fig. 4 is a vertical section of a press-mold in which the completed article shown in Fig. 5 is formed.

In my process I require two molds, one of which is shown in Figs. 1 and 2 and the other one in Fig. 4. The mold shown in Figs. 1 and 2 has a body consisting of two semi-cylindrical parts, C and B, which open on hinges formed by the projections B′ B² from the part B, and the projections C′ from the part C, S being the pintle which passes through the parts B′, C′, and B², and is affixed solidly in the circular base-piece A.

D is a cap divided to correspond with the halves of the mold, one division being attached to each half.

C², C³, and B′ are ears attached, respectively, to the parts C and B of the mold, and serve to keep the parts in proper adjustment.

Within the interior of this mold a cylindrical recess is formed, provided with a screw-thread, as shown in Fig. 2. The mold is also provided with a blow-over recess, D′.

In the mold just described the hollow glass screw shown in Fig. 3 is formed by the ordinary method of blowing, there being nothing new in the mold described nor in the hollow glass screw.

In Fig. 4 I have represented the essential parts of a press-mold, the details of which may be made after any of the approved styles. In this mold, K′ forms the top; K, the body, and K² the base, P being a plunger or "point." The interior of this mold is made of such shape as is desirable to have in the completed article— H, Fig. 5, for instance.

To form a screw in glass by my improved process I proceed as follows: A thin hollow glass screw like the one shown in Fig. 3 is blown in the mold, Figs. 1 and 2. It is then placed on the plunger P of the mold, Fig. 4, the plunger P being withdrawn from the mold. Hot glass is then placed in the mold, Fig. 4, and the plunger P, taking with it the hollow glass screw E, is forced down into the mold. This action causes the glass to fill the mold round the hollow screw of glass and to unite with the hollow screw. The plunger P may be then withdrawn, the mold opened, and a completed article, H, removed.

Having thus described my invention, what I desire to secure by Letters Patent is—

The process above described of forming screws in glass by first making the thin cylindrical part E, and then inserting it by a press-mold in hot glass H, substantially as described, and for the purpose set forth.

SAMUEL OAKMAN.

Witnesses:
HELEN M. FEEGAN,
FRANK G. PARKER.